UNITED STATES PATENT OFFICE.

BENJAMIN CRABTREE CALDERWOOD, OF WOONSOCKET, RHODE ISLAND.

PROCESS OF TREATING STEEL.

1,044,486.  Specification of Letters Patent.  Patented Nov. 19, 1912.

No Drawing.  Application filed March 7, 1912.  Serial No. 682,249.

*To all whom it may concern:*

Be it known that I, BENJAMIN C. CALDERWOOD, a citizen of the United States, residing at Woonsocket, in the county of Providence and State of Rhode Island, have invented certain new and useful Improvements in Processes of Treating Steel, of which the following is a specification, reference being had therein to the accompanying drawing.

This invention pertains to the treatment of Jessop's, or other ordinary tool-steel, when made into cotton-picker fingers, or other implements, in suchwise that they will be tough enough for normal service, workable with tools, and yet brittle enough to break sharply off if subjected to undue strains that would ordinarily bend them.

The immediate object of this invention is to make the fingers of cotton-picking machines, such, for example, as shown in Campbell's United States Patent No. 722,421, dated March 10, 1903, sufficiently brittle to be broken off rather than bent under conditions of use. If any of such fingers, which are commonly mounted in rows adjacent to one another and which in each row are also adjacent one to another, and which are severally rotated on their lengthwise, horizontal axes and are also carried by vertical rotatable picker-finger carriers, become bent sufficiently to get into contact with other fingers, then several fingers are apt to be broken and the machine must be stopped for repairs.

So far as I know, the present invention is of a generic character, but whether it is or not, it results in a cotton-picker finger of novel mode of behavior, and of great utility.

In accordance with my new method, the picker-fingers, or other implements, are preferably although not necessarily, formed out of Jessop's or other recognized tool-steel before being subjected to the following treatment:—I fill iron boxes with a mixture composed of raw, granulated bone, 50%, and 50% of burned bone, or bone from which animal matter has been removed; the raw and other bone being thoroughly mixed. I then insert the fingers in the mixture, spacing them apart so that they will be separated and covered by the bone mixture and out of contact with the box walls. The mixture and contained fingers are then covered with damp fire-clay, and a cover put as air-tightly as feasible on the box, which is then placed in a case-hardening furnace wherein the heat is allowed to rise slowly until it reaches a temperature of 1450 degrees Fah., at which the heat is held for three hours. The box is then removed and its contents emptied into an oil bath to harden the fingers. When the fingers have been cooled in the oil, they are removed and immersed in molten lead raised to a temperature of 1200 degrees Fah. I allow them to remain in the molten lead for about two minutes; then remove them and allow them to cool slowly. When cold, their tempering process is completed.

The foregoing is the preferred mode of procedure, but the times referred to may be somewhat varied without departure from the invention.

Other articles and implements may be treated in the same manner when desired.

My invention has a considerable range of practical applicability.

What I claim is:—

The method of treating cotton-picker fingers or other implements of Jessop's or comparable tool steel, consisting in covering the steel pieces severally with a mixture of raw and burned bone; in subjecting the bone mixture and pieces out of contact with outside air to heat gradually increased up to about 1450 degrees Fahrenheit; in holding the mixture and contained pieces at such heat for about three hours; in cooling the so treated pieces in oil; in immersing the so cooled pieces in molten lead at a temperature of about 1200 degrees Fahrenheit; and in subsequently removing the pieces from the lead bath and slowly cooling them.

In testimony whereof I affix my signature in presence of two witnesses.

BENJAMIN CRABTREE CALDERWOOD.

Witnesses:
 JOHN C. CASSEBORNE,
 CHARLES F. PARKER.

Copies of this patent may be obtained for five cents each, by addressing the "Commissioner of Patents, Washington, D. C."